(12) United States Patent
Hwangbo et al.

(10) Patent No.: US 11,619,840 B2
(45) Date of Patent: *Apr. 4, 2023

(54) LIQUID CRYSTAL PANEL AND METHOD FOR ETCHING LIQUID CRYSTAL PANEL

(71) Applicant: KORTEK CORPORATION, Incheon (KR)

(72) Inventors: Woo Hwangbo, Yongin-si (KR); Young Il Park, Incheon (KR); Hae Won Chae, Hwaseong-si (KR); Ji Woong Park, Jeonju-si (KR)

(73) Assignee: KORTEK CORPORATION, Incheon (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/299,811

(22) PCT Filed: Dec. 10, 2019

(86) PCT No.: PCT/KR2019/017339
§ 371 (c)(1),
(2) Date: Jun. 4, 2021

(87) PCT Pub. No.: WO2020/122537
PCT Pub. Date: Jun. 18, 2020

(65) Prior Publication Data
US 2022/0026756 A1 Jan. 27, 2022

(30) Foreign Application Priority Data
Dec. 11, 2018 (KR) .......... 10-2018-0159302

(51) Int. Cl.
G02F 1/1333 (2006.01)
G02F 1/1339 (2006.01)

(52) U.S. Cl.
CPC ...... *G02F 1/133305* (2013.01); *G02F 1/1339* (2013.01)

(58) Field of Classification Search
None
See application file for complete search history.

(56) References Cited

U.S. PATENT DOCUMENTS

2017/0351135 A1 12/2017 Kim et al.
2018/0321540 A1* 11/2018 Cho .............. G02F 1/1333
(Continued)

FOREIGN PATENT DOCUMENTS

KR 10-1333770 B1 11/2013
KR 10-2015-0083448 A 7/2015
(Continued)

OTHER PUBLICATIONS

International Search Report for PCT/KR2019/017339 dated Mar. 17, 2020.

*Primary Examiner* — Shan Liu
(74) *Attorney, Agent, or Firm* — Schmeiser, Olsen & Watts, LLP

(57) ABSTRACT

Provided is a liquid crystal panel and an etching method for a liquid crystal panel. The liquid crystal panel includes: a first substrate; and a second substrate installed spaced apart from the first substrate with a liquid crystal layer interposed therebetween, in which a non-etched region of the first substrate and a non-etched region of the second substrate are positioned to be offset from each other.

11 Claims, 7 Drawing Sheets

(56) References Cited

U.S. PATENT DOCUMENTS

2019/0113795 A1\* 4/2019 Lee .......................... G09F 9/00
2022/0026755 A1\* 1/2022 Hwangbo ............. G02F 1/1339

FOREIGN PATENT DOCUMENTS

| KR | 10-2016-0112123 A | 9/2016 | | |
|---|---|---|---|---|
| KR | 101658432 B1 | \* | 9/2016 | |
| KR | 101676851 B1 | \* | 11/2016 | |
| KR | 10-2017-0143355 A | 12/2017 | | |
| WO | WO-2021025422 A1 | \* | 2/2021 | ........... G02F 1/1333 |

\* cited by examiner

LIQUID CRYSTAL PANEL AND METHOD FOR ETCHING LIQUID CRYSTAL PANEL

CROSS-REFERENCE TO RELATED APPLICATIONS

This application claims priority to PCT Application No. PCT/KR2019/017339, having a filing date of Dec. 10, 2019, based on KR 10-2018-0159302, having a filing date of Dec. 11, 2018, the entire contents all of which are hereby incorporated by reference.

FIELD OF TECHNOLOGY

The following relates to a liquid crystal panel and a method of etching a liquid crystal panel, and more particularly, to a liquid crystal panel, which is stably bendable without being damaged, and a liquid crystal panel etching method.

BACKGROUND

With the development of the information society, display devices capable of displaying information are being actively developed. The display devices include liquid crystal display (LCD) devices, organic electro-luminescence display devices, plasma display panel devices, and field emission display devices.

Among the display devices, since the LCD devices have advantages of a thin thickness, low power consumption, and a full-color video implementation, the LCD devices are being widely applied to mobile phones, navigation devices, monitors, televisions, and the like.

The LCD device adjusts light transmittance of liquid crystal cells on a liquid crystal panel to display an image corresponding to a video signal. Typically, the liquid crystal panel includes a lower substrate, an upper substrate, and a liquid crystal layer interposed therebetween.

A thin film transistor (TFT)-LCD using a TFT as a switching element is mainly used as the LCD device. A plurality of display signal lines, such as gate lines, data lines, and a plurality of TFTs, and pixel electrodes are formed on a lower substrate of two substrates of the liquid crystal panel, which are disposed to face each other, and a color filter and a common electrode are formed on an upper substrate of the two substrates.

Since the liquid crystal panel is usually manufactured in a flat shape, when a curved display is required, an etching solution is sprayed onto the liquid crystal panel to thin the liquid crystal panel to a set thickness, and then a process of bending the liquid crystal panel is performed.

A driving circuit may be installed on an edge of the liquid crystal panel and may include a printed circuit board (PCB) through which signals are transmitted and a chip on film (COP) which connects the PCB to the liquid crystal panel. In addition, when the etching solution is sprayed on the edge of the liquid crystal panel, the edge of the liquid crystal panel can be easily broken. Thus, a masking process is performed to prevent the etching solution from being sprayed on the edge of the liquid crystal panel.

According to the related art, when the liquid crystal panel on which etching is performed is bent, since the edge of the liquid crystal panel, on which the etching is not performed, has a thickness that is greater than a thickness of a portion on which the etching is performed, there is a problem in that the edge is damaged during bending. Therefore, there is a need to solve such a problem.

The background art of the present invention is disclosed in Korean Patent Registration No. 10-1333770 (registered on Nov. 21, 2013, entitled "Etching device, Apparatus for manufacturing display panel with curved shape and of comprising the device, Method for manufacturing display panel with curved shape by using the apparatus, display panel with curved shape manufactured by the method").

SUMMARY

An aspect relates to providing a liquid crystal panel, which is stably bendable without being damaged, and a method of etching a liquid crystal panel.

One aspect of embodiments of the present invention provides a liquid crystal panel including a first substrate and a second substrate installed in a state of being spaced apart from the first substrate with a liquid crystal layer interposed therebetween, wherein a non-etched region of the first substrate is located to be offset from a non-etched region of the second substrate.

The first substrate may include a first base member which is formed in a plate shape facing the liquid crystal layer and on which etching is performed twice, a first head portion which is connected to one side of the first base member and on which etching is not performed, and a first tail portion which is connected to the other side of the first base member and on which only primary etching is performed.

Each of the first head portion and the first tail portion may be thicker than a thickness of the first base member.

The first head portion may be thicker than the first tail portion.

The second substrate may include a second base member which is formed to face the first base member and the first head portion with the liquid crystal layer interposed therebetween and on which etching is performed twice, a second head portion which is connected to one side of a second base member and on which etching is not performed, and a second tail portion which is connected to the other side of the second base member and on which only primary etching is performed.

Each of the second head portion and the second tail portion may be thicker than the second base member.

The second head portion may be thicker than the second tail portion.

The first head portion is disposed to be offset from the second head portion with a separation section disposed therebetween.

Another aspect of embodiments of the present invention provides a method of etching a liquid crystal panel, which includes installing an encapsulation portion which surrounds a first head portion of a first substrate, a second head portion of a second substrate, and a control portion connected to the second substrate and prevents infiltration of an etching solution; performing primary etching on the first substrate and the second substrate using the etching solution; installing a masking member in portions of the first substrate and the second substrate, on which only the primary etching is performed; performing secondary etching on the first substrate and the second substrate using the etching solution; and removing the encapsulation portion and the masking member.

The installing of the encapsulation portion may include installing an encapsulation member which surrounds an outer side of the control portion, and fixing the encapsulation member to the first head portion and the second head portion using a masking tape.

In the installing of the encapsulation portion, the masking tape may cover outer sides of the first head portion and the second head portion to prevent infiltration of the etching solution.

In the performing of the primary etching on the first substrate and the second substrate, a first base member and a first tail portion of the first substrate may be etched at the same thickness, and a second base member and a second tail portion of the second substrate may also be etched at the same thickness.

In the installing of the masking tape, the masking member may be installed on outer sides of the first tail portion and the second tail portion.

In the performing of the secondary etching on the first substrate and the second substrate, only the first base member and only the second base member may be secondarily etched.

In accordance with a liquid crystal panel and a liquid crystal panel etching method according to embodiments of the present invention, masking is applied differently to a first substrate and a second substrate, and a thickness of a non-etched region formed after etching the first substrate and the second substrate using a double etching method is decreased so that a display with a small radius of curvature can be easily implemented.

BRIEF DESCRIPTION

Some of the embodiments will be described in detail, with reference to the following figures, wherein like designations denote like members, wherein.

Figure 1:
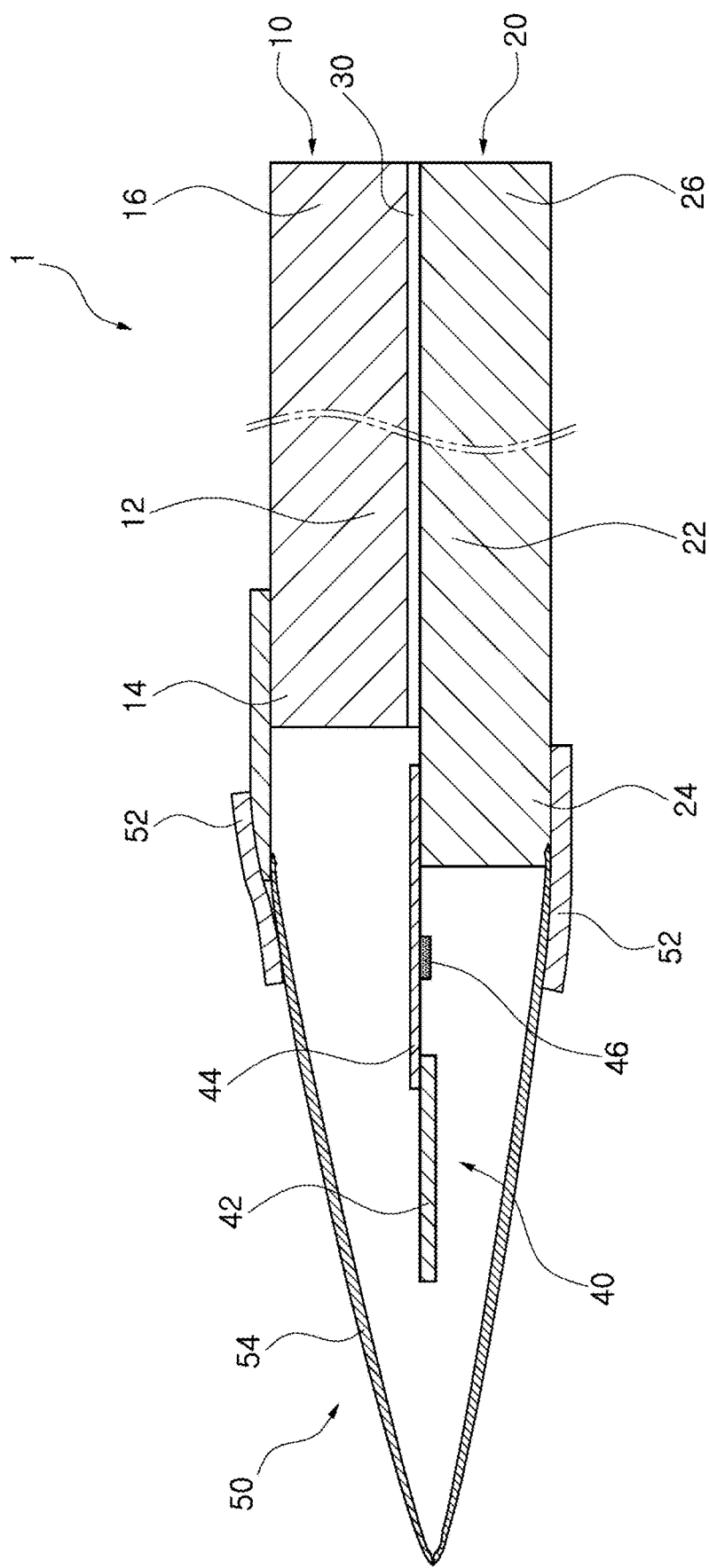
FIG. 1 is a cross-sectional view illustrating a state in which an encapsulation portion is installed on a liquid crystal panel according to one embodiment of the present invention.

Hereinafter, a liquid crystal panel and a liquid crystal panel etching method according to one embodiment of the present invention will be described with reference to the accompanying drawings. In the following description, thicknesses of lines and sizes of components shown in the drawings may be exaggerated for clarity and convenience of description.

In addition, the terms described below are defined in consideration of the functions in embodiments of the present invention, and these terms may be varied according to the intent or custom of a user or an operator. Therefore, these terms should be defined on the basis of the contents throughout the present application.

Figure 2:
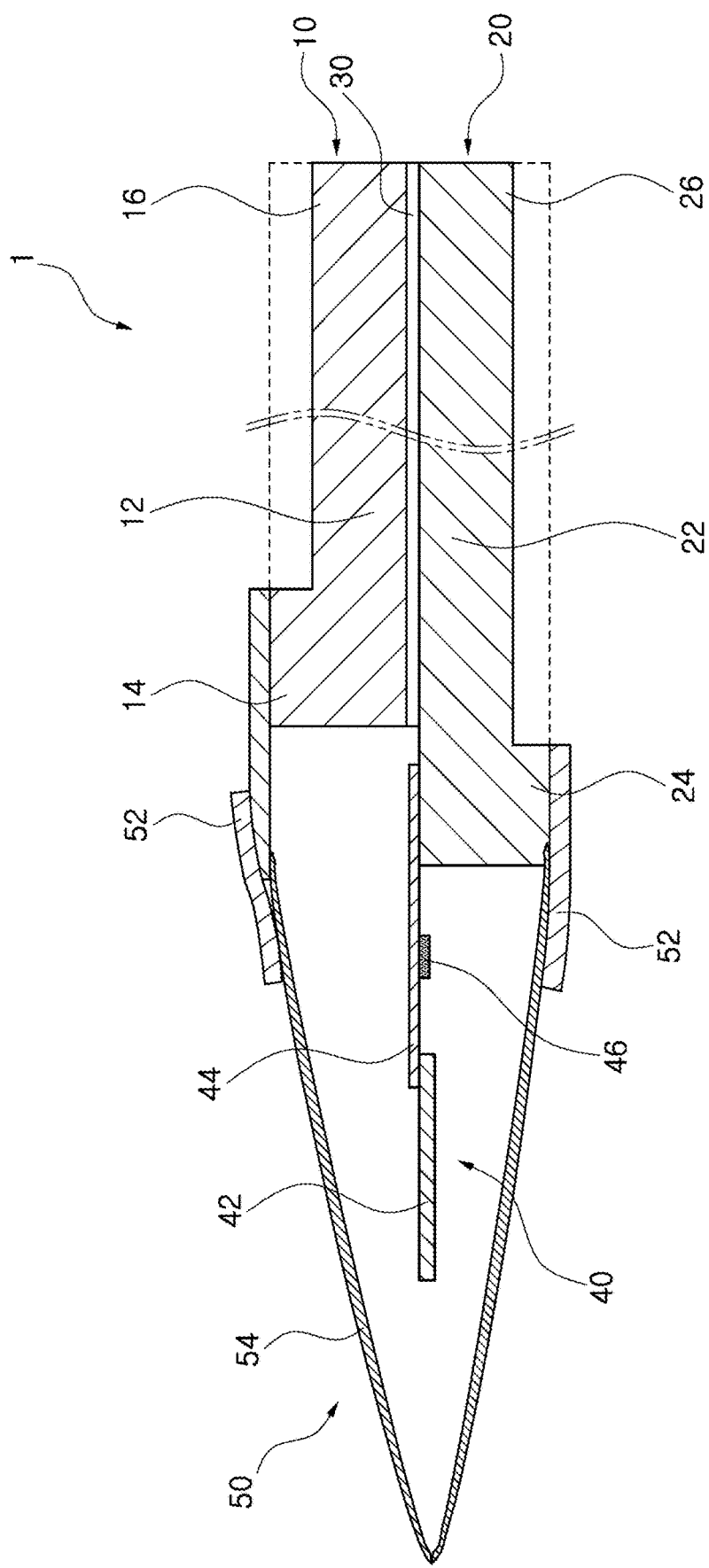
FIG. 2 is a cross-sectional view illustrating a state in which the liquid crystal panel is primarily etched according to one embodiment of the present invention.
Figure 3:
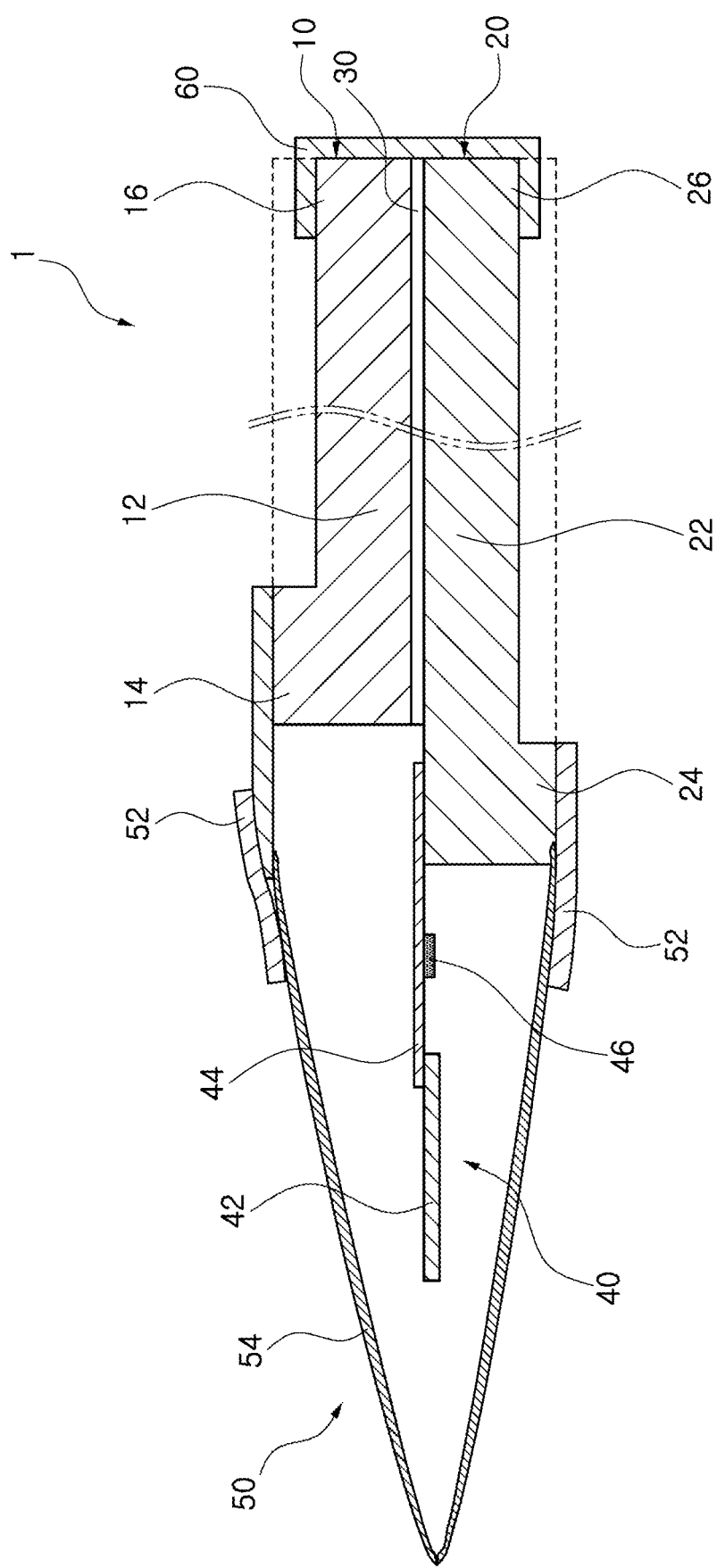
FIG. 3 is a cross-sectional view illustrating a state in which a masking member is installed on an outer side of the liquid crystal panel according to one embodiment of the present invention.
Figure 4:
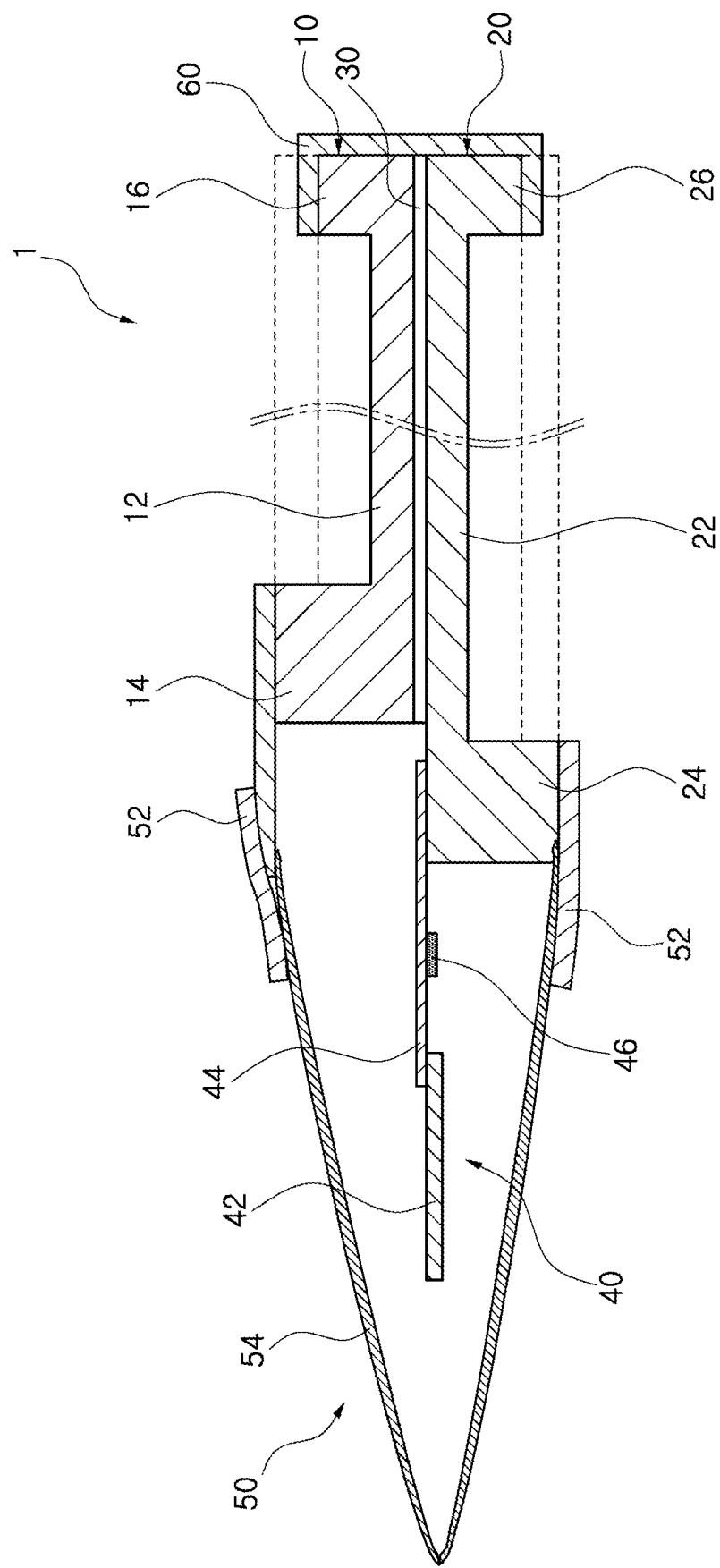
FIG. 4 is a cross-sectional view illustrating a state in which the liquid crystal panel is secondarily etched according to one embodiment of the present invention.
Figure 5:
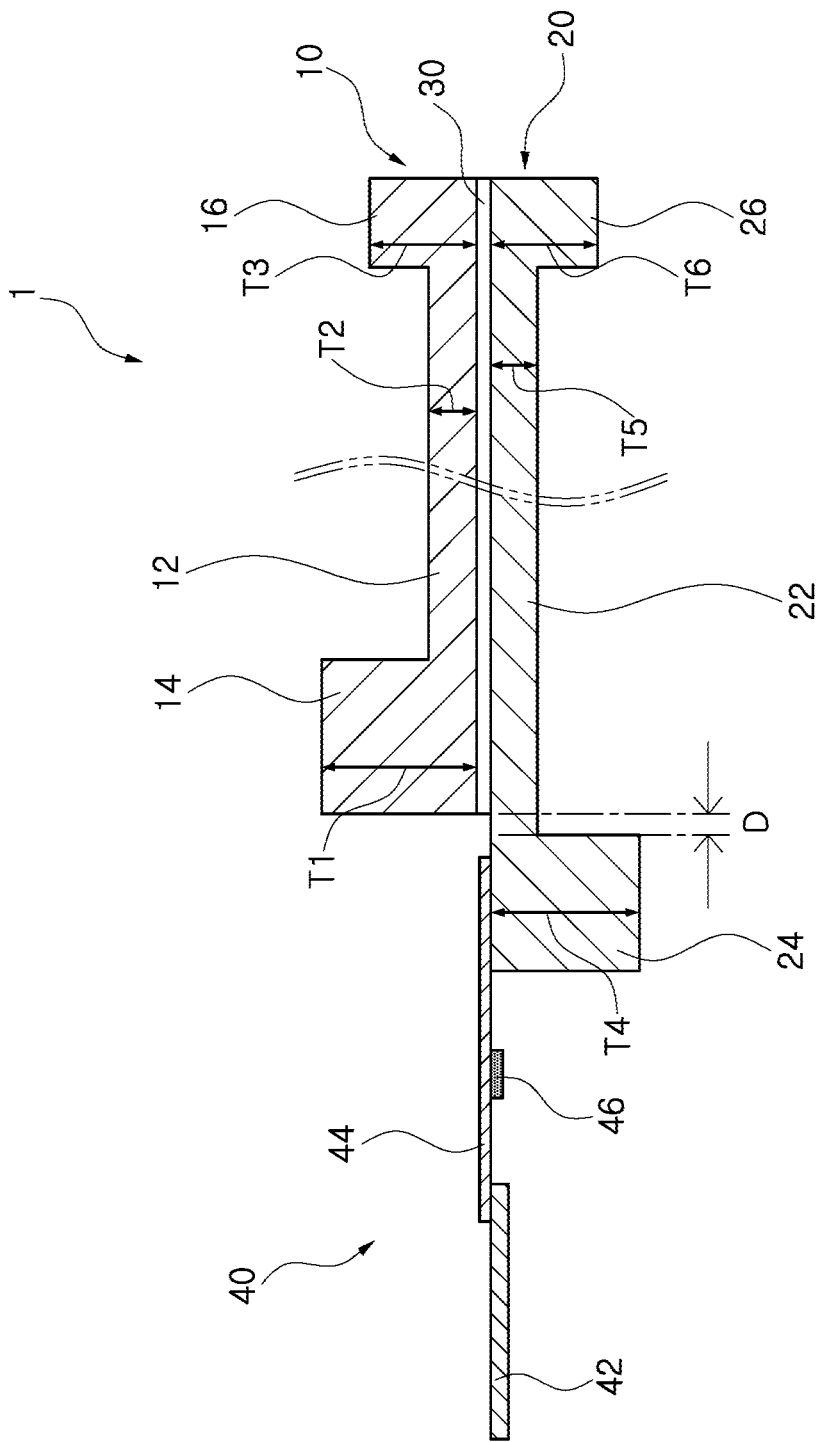
FIG. 5 is a cross-sectional view illustrating a state in which the encapsulation portion and the masking member are removed from the liquid crystal panel according to one embodiment of the present invention.
Figure 6:
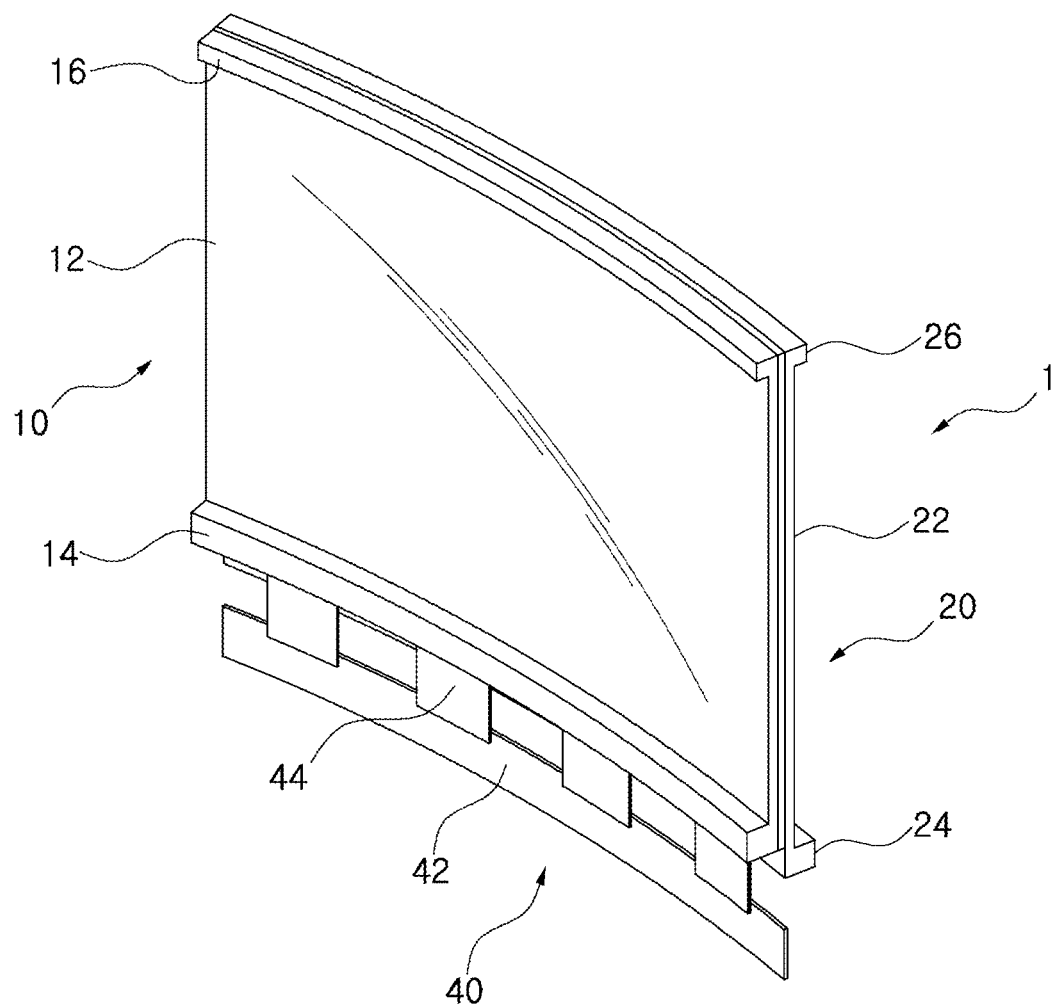
FIG. 6 is a perspective view illustrating a state in which the liquid crystal panel is bent in a curved shape according to one embodiment of the present invention.

FIG. 1 is a cross-sectional view illustrating a state in which an encapsulation portion is installed on a liquid crystal panel according to one embodiment of the present invention, FIG. 2 is a cross-sectional view illustrating a state in which the liquid crystal panel is primarily etched according to one embodiment of the present invention, FIG. 3 is a cross-sectional view illustrating a state in which a masking member is installed on an outer side of the liquid crystal panel according to one embodiment of the present invention, FIG. 4 is a cross-sectional view illustrating a state in which the liquid crystal panel is secondarily etched according to one embodiment of the present invention, FIG. 5 is a cross-sectional view illustrating a state in which the encapsulation portion and the masking member are removed from the liquid crystal panel according to one embodiment of the present invention, and FIG. 6 is a perspective view illustrating a state in which the liquid crystal panel is bent in a curved shape according to one embodiment of the present invention.

As shown in FIGS. 1 to 6, a liquid crystal panel 1 according to one embodiment of the present invention includes a first substrate 10 and a second substrate 20 installed in a state of being spaced apart from the first substrate 10 with a liquid crystal layer 30 interposed therebetween. The liquid crystal panel 1 is characterized in that a non-etched region of the first substrate 10 is located to be offset from a non-etched region of the second substrate 20.

According to embodiments of the present invention, a thickness of the non-etched region, which is formed when the liquid crystal panel 1 is etched, is decreased so that, when the liquid crystal panel 1 is bent with a small radius of curvature, a stable panel shape may be obtained. To this end, different masking and etching methods are applied to locations according to a structural shape of the liquid crystal panel 1.

A variety of modifications of the liquid crystal panel 1 are possible within the technical spirit of bonding a plurality of glasses. The liquid crystal panel 1 according to one embodiment is coupled in a state in which the first substrate 10 and the second substrate 20 face each other, and the liquid crystal layer 30 is provided between the first substrate 10 and the second substrate 20.

According to one embodiment, the first substrate 10 is a color filter (CF) substrate and the second substrate 20 is a thin film transistor (TFT) substrate. The first substrate 10 is spaced a predetermined interval from the second substrate 20, and a liquid crystal is injected between the first substrate 10 and the second substrate 20 to form the liquid crystal layer 30.

The liquid crystal panel 1 has a structure in which the first substrate 10 and the second substrate 20 are bonded, and an electrode pattern is formed on the second substrate 20 to allow an electrical signal to be applied. A portion of the electrode pattern formed on the second substrate 20 is exposed to the outside of the second substrate 20 and designed to receive an electrical signal applied from the outside.

That is, when the first substrate 10 and the second substrate 20 are bonded, some electrodes of the second substrate 20 are bonded to be exposed to the outside. Generally, the second substrate 20 is designed to have a total area that is greater than an area of the first substrate 10. The electrodes exposed from the second substrate 20 may be coupled to other devices to receive electrical signals.

In addition, the liquid crystal panel 1 is formed in a rectangular shape, and the second substrate 20 located on one side of the liquid crystal panel 1 is installed in a shape protruding further than the first substrate 10. A control portion 40 is connected to the second substrate 20. The control portion 40 includes a printed circuit board (PCB) 42, a flexible connector 44, and a driving chip 46.

The driving chip 46, which is a driver-IC, is connected to the flexible connector 44, one side of the flexible connector 44 is connected to the PCB 42, and the other side thereof is connected to the second substrate 20. The flexible connector 44 has a film shape which is easily bent, and the control portion 40 receives an external signal.

The first substrate 10 according to one embodiment includes a first base member 12, a first head portion 14, and a first tail portion 16.

The first base member 12 has a plate shape facing the liquid crystal layer 30 and is etched twice. The first base member 12 is a rectangular panel, a thickness of the first base member 12 is decreased through the primary etching, and then the thickness thereof is further decreased through the secondary etching.

The first head portion 14 is connected to one side of the first base member 12 (a left side of FIG. 4) and is a non-etched region on which etching is not performed. The first tail portion 16 is connected to the other side of the first base member 12 (a right side of FIG. 4), and only the primary etching is performed on the first tail portion 16 whereas the secondary etching is not performed thereon.

A thickness of each of the first head portion 14 and the first tail portion 16 is greater than a thickness of the first base member 12, and the thickness of the first head portion 14 is greater than the thickness of the first tail portion 16.

When the thickness of the first head portion 14 is set to a first thickness T1, the thickness of the first base member 12 is set to a second thickness T2, and the thickness of the first tail portion 16 is set to a third thickness T3, the first thickness T1 is greater than the third thickness T3, and the third thickness T3 is greater than the second thickness T2.

The second substrate 20 is installed in a state of being spaced apart from the first substrate 10 with the liquid crystal layer 30 interposed therebetween. Since the non-etched region of the first substrate 10 is located to be offset from the non-etched region of the second substrate 20, the thickness of the liquid crystal panel 1 may be decreased and formability may be improved.

The non-etched region is a portion on which etching is not performed in the liquid crystal panel 1. Since masking tape 52 is attached to outer sides of the first head portion 14 of the first substrate 10 and the second head portion 24 of the second substrate 20, the outer sides thereof become non-etched regions.

The second substrate 20 according to one embodiment includes a second base member 22, a second head portion 24, and a second tail portion 26.

The second base member 22 is installed in a shape facing the first base member 12 and the first head portion 14 with the liquid crystal layer 30 interposed therebetween. The second base member 22 is a rectangular panel and has a length that is greater than the sum of lengths of the first base member 12 and the first head portion 14. In addition, a thickness of the second base member 22 is decreased through primary etching, and then the thickness thereof is further decreased through secondary etching.

The second head portion 24 is connected to one side of the second base member 22 (the left side of FIG. 4), and etching is not performed on the second head portion 24. In addition, the second tail portion 26 is connected to the other side of the second base member 22 (the right side of FIG. 4) and only primary etching is performed on the second tail portion 26.

A thickness of each of the second head portion 24 and the second tail portion 26 is greater than a thickness of the second base member 22, and the thickness of the second head portion 24 is greater than the thickness of the second tail portion 26. When the thickness of the second head portion 24 is set to a fourth thickness T4, the thickness of the second base member 22 is set to a fifth thickness T5, and the thickness of the second tail portion 26 is set to a sixth thickness T6, the fourth thickness T4 is greater than the sixth thickness T6, and the sixth thickness T6 is greater than the fifth thickness T5. In addition, the first thickness T1 is the same as the fourth thickness T4, the second thickness T2 is the same as the fifth thickness T5, and the third thickness T3 is the same as the sixth thickness T6.

In addition, since the first head portion 14 and the second head portion 24, which are non-etched regions, are installed to be offset from each other with a separation section D interposed therebetween, a vertical thickness of the liquid crystal panel 1 is decreased.

As shown in FIG. 5, a gap between an imaginary line extending downward from an end portion of the first head portion 14 (a left side of FIG. 5) and an imaginary line extending downward from an end portion of one end of the second head portion 24 (a right side of FIG. 5) is referred to as the separation section D. In the liquid crystal panel 1, since the separation section D is provided between the first head portion 14 and the second head portion 24, which are the non-etched regions, the vertical thickness of the liquid crystal panel 1 may be maintained to be thin when compared to the related art.

That is, since the first substrate 10 is not located above the second head portion 24, the thickness of the second head portion 24 becomes the thickness of the liquid crystal panel 1, and the thickness of the liquid crystal panel 1 in the separation section D becomes the thickness of the second base member 22. In addition, at a position at which the first head portion 14 and the second base member 22 face each other, the sum of the thicknesses of the first head portion 14 and the second base member 22 becomes the thickness of the liquid crystal panel 1. At a position at which the first base member 12 and the second base member 22 face each other, the sum of the thicknesses of the first base member 12 and the second base member 22 becomes the thickness of the liquid crystal panel 1. In addition, at a position at which the first tail portion 16 and the second tail portion 26 face each other, the sum of the thicknesses of the first tail portion 16 and the second tail portion 26 becomes the thickness of the liquid crystal panel 1.

A variety of modifications are possible within the technical spirit in which the encapsulation portion 50 is installed in a shape surrounding the first head portion 14, the control portion 40, and the second head portion 24 so as to prevent an etching solution from infiltrating into the control portion 40. The encapsulation portion 50 according to one embodiment includes the masking tape 52 and an encapsulation member 54.

The encapsulation member 54 is in the form of an envelope and prevents the etching solution from infiltrating into the control portion 40. In a state in which the encapsulation member 54 surrounds the control portion 40, the encapsulation member 54 is fixed using the masking tape 52.

The masking tape 52, which fixes the encapsulation member 54, is attached to an outer side of the first head portion 14 of the first substrate 10 and an outer side of the second head portion 24 of the second substrate 20. Thus, during an etching process, the masking tape 52 prevents the etching solution from infiltrating into the control portion 40, the first head portion 14, and the second head portion 24.

In order to prevent the first tail portion 16 and the second tail portion 26 from being further etched after the primary etching is performed, a masking member 60 is installed on outer sides of the first tail portion and the second tail portion 26.

Various types of acid-resistant materials may be used as the masking member 60 within the technical spirit of preventing an etching solution from infiltrating into the first tail portion 16 and the second tail portion 26 during the etching process. The masking member 60 according to one embodiment employs polyvinyl chloride (PVC) and is installed in the form of surrounding the outer sides of the first tail portion 16 and the second tail portion 26.

Hereinafter, a method of etching a liquid crystal panel according to one embodiment of the present invention will be described in detail with reference to the accompanying drawings.

Figure 7:
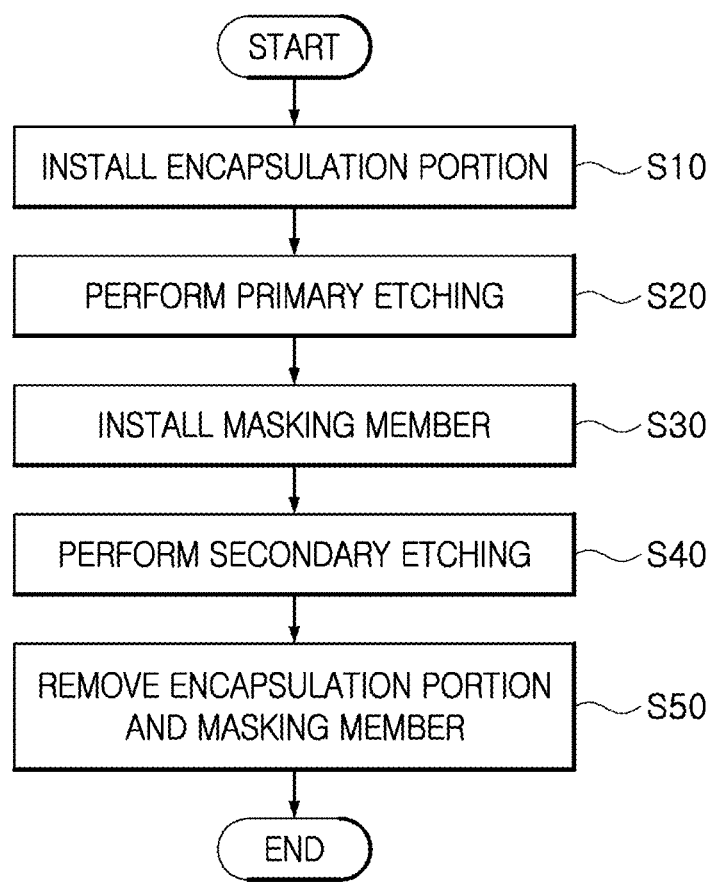
FIG. 7 is a flowchart illustrating a method of etching a liquid crystal panel according to one embodiment of the present invention.

FIG. 7 is a flowchart illustrating a liquid crystal panel etching method according to one embodiment of the present invention.

As shown in FIGS. 1 and 7, the method of etching the liquid crystal panel according to one embodiment of the present invention includes installing the encapsulation portion 50 which surrounds the first head portion 14 of the first substrate 10, the second head portion 24 of the second substrate 20, and the control portion 40 connected to the second substrate 20 and prevents an etching solution from infiltrating into the first head portion 14, the second head portion 24, and the control portion 40 (S10).

The installing of the encapsulation portion 50 according to one embodiment includes installing the encapsulation member 54 which surrounds an outer side of the control portion 40 and fixing the encapsulation member 54 to the first head portion 14 and the second head portion 24 using the masking tape 52.

The fixing of the encapsulation member 54 using the masking tape 52 is performed. In the installing of the encapsulation portion 50, since the masking tape 52 covers the outer sides of the first head portion 14 and the second head portion 24 to prevent the etching solution from infiltrating into the first head portion 14 and the second head portion 24, the first head portion 14 and the second head portion 24 become the non-etched regions.

In addition, as shown in FIGS. 2 and 7, the method of etching the liquid crystal panel includes primarily etching the first substrate 10 and the second substrate 20 using the etching solution (S20). In the primary etching of the first substrate 10 and the second substrate 20, the 5 first base member 12 and the first tail portion 16 of the first substrate 10 are etched at the same thickness, and the second base member 22 and the second tail portion 26 of the second substrate 20 are also etched at the same thickness.

After the primary etching, only the first head portion 14 and the second head portion 24 to which the masking tape 52 is attached remain the non-etched regions, and the entire area of the liquid crystal panel 1 is etched to decrease a thickness thereof.

In addition, as shown in FIGS. 3 and 7, the method of etching the liquid crystal panel includes installing the masking member 60 in portions of the first substrate 10 and the second substrate 20, on which only the primary etching is performed (S30). In the installing of the masking member 60 according to one embodiment, since the masking member 60 is installed on outer sides of the first tail portion 16 and the second tail portion 26, on which only the primary etching is performed, secondary etching is prevented from being performed.

Since the first substrate 10 and the second substrate 20 are bonded to each other with the same size, an installation position of the masking member 60 may be determined in consideration of a bending direction of a display to be implemented.

As shown in FIGS. 4 and 7, the method of etching the liquid crystal panel includes secondarily etching the first substrate 10 and the second substrate 20 using the etching solution (S40). In the secondary etching of the first substrate 10 and the second substrate 20, only the first base member 12 and the second base member 22, in which the masking member 60 is not installed, are secondarily etched.

In addition, as shown in FIGS. 5 to 7, the method of etching the liquid crystal panel includes removing the encapsulation portion 50 and the masking member 60 (S50). The liquid crystal panel 1 in which the encapsulation portion 50 and the masking member 60 are removed is bent at a set curvature so that more stable formability may be provided.

As described above, according to embodiments of the present invention, masking is applied differently to the first substrate 10 and the second substrate 20, and the thickness of the non-etched region, which is formed after the first substrate 10 and the second substrate 20 are etched through a double etching method, is reduced so that a display with a small radius of curvature may be easily implemented.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements. The mention of a "unit" or a "module" does not preclude the use of more than one unit or module.

The invention claimed is:

1. A liquid crystal panel comprising:
a first substrate; and
a second substrate installed in a state of being spaced apart from the first substrate with a liquid crystal layer interposed therebetween,
wherein a non-etched region of the first substrate is located to be offset from a non-etched region of the second substrate;
wherein the first substrate includes: a first base member which is formed in a plate shape facing the liquid crystal layer and on which etching is performed twice; a first head portion which is connected to one side of the first base member and on which etching is not performed; and a first tail portion which is connected to the other side of the first base member and on which only primary etching is performed;
wherein each of the first head portion and the first tail portion has a constant thickness and is thicker than the first base member; and
the first head portion is thicker than the first tail portion.

2. The liquid crystal panel of claim 1, wherein the second substrate includes:
a second base member which is formed to face the first base member and the first head portion with the liquid crystal layer interposed therebetween and on which etching is performed twice;

a second head portion which is connected to one side of a second base member and on which etching is not performed; and a second tail portion which is connected to the other side of the second base member and on which only primary etching is performed.

3. The liquid crystal panel of claim 2, wherein each of the second head portion and the second tail portion is thicker than the second base member.

4. The liquid crystal panel of claim 3, wherein the second head portion is thicker than the second tail portion.

5. The liquid crystal panel of claim 2, wherein the first head portion is disposed to be offset from the second head portion with a separation section disposed therebetween.

6. A method of etching a liquid crystal panel, comprising:
   installing an encapsulation portion which surrounds a first head portion with a constant thickness of a first substrate, a second head portion with a constant thickness of a second substrate, and a control portion connected to the second substrate so as to prevent infiltration of an etching solution;
   performing primary etching on the first substrate and the second substrate using the etching solution;
   installing a masking member in portions of the first substrate and the second substrate on which only the primary etching is performed;
   performing secondary etching on the first substrate and the second substrate using the etching solution; and
   removing the encapsulation portion and the masking member.

7. The method of claim 6, wherein the installing of the encapsulation portion includes:
   installing an encapsulation member which surrounds an outer side of the control portion; and
   fixing the encapsulation member to the first head portion and the second head portion using a masking tape.

8. The method of claim 7, wherein in the installing of the encapsulation portion, the masking tape covers outer sides of the first head portion and the second head portion to prevent infiltration of the etching solution.

9. The method of claim 6, wherein in the performing of the primary etching on the first substrate and the second substrate, a first base member and a first tail portion of the first substrate are etched at the same thickness, and a second base member and a second tail portion of the second substrate are etched at the same thickness.

10. The method of claim 9, wherein in the installing of the masking tape, the masking member is installed on outer sides of the first tail portion and the second tail portion.

11. The method of claim 10, wherein in the performing of the secondary etching on the first substrate and the second substrate, only the first base member and only the second base member are secondarily etched.

* * * * *